(12) United States Patent
Gordon

(10) Patent No.: US 8,840,080 B1
(45) Date of Patent: Sep. 23, 2014

(54) WALL HANGING SYSTEM

(71) Applicant: Michael Gordon, Newport Beach, CA (US)

(72) Inventor: Michael Gordon, Newport Beach, CA (US)

( * ) Notice: Subject to any disclaimer, the term of this patent is extended or adjusted under 35 U.S.C. 154(b) by 4 days.

(21) Appl. No.: 13/864,124

(22) Filed: Apr. 16, 2013

(51) Int. Cl.
*A47G 1/16* (2006.01)
*F16M 13/00* (2006.01)
*F16M 13/02* (2006.01)

(52) U.S. Cl.
CPC ..................................... *F16M 13/02* (2013.01)
USPC ........ 248/546; 248/544; 248/466; 248/475.1; 248/216.4; 248/316.4

(58) Field of Classification Search
USPC .............. 248/546, 544, 466, 475.1, 488, 496, 248/216.1, 217.3, 265, 258, 259, 260, 248/316.4, 316.8, 298.1; 33/613
See application file for complete search history.

(56) References Cited

U.S. PATENT DOCUMENTS

| | | | | |
|---|---|---|---|---|
| 779,433 | A * | 1/1905 | Long | 248/495 |
| 1,107,686 | A * | 8/1914 | Mehrmann | 248/495 |
| 2,681,194 | A * | 6/1954 | Halvorsen | 248/495 |
| 2,964,279 | A * | 12/1960 | Galloway | 248/27.1 |
| 2,986,366 | A * | 5/1961 | Wesson | 248/285.1 |
| 3,188,028 | A * | 6/1965 | Waller | 248/489 |
| 4,494,296 | A * | 1/1985 | Grimes | 29/432 |
| 4,753,014 | A * | 6/1988 | Vrajich | 33/613 |
| 4,892,284 | A * | 1/1990 | Kelrick | 248/476 |
| 5,069,411 | A * | 12/1991 | Murphy | 248/476 |
| 5,103,573 | A * | 4/1992 | Ehling et al. | 33/613 |
| 5,471,760 | A * | 12/1995 | Farris | 33/613 |
| 6,003,825 | A * | 12/1999 | Abernathy, Jr. | 248/478 |
| 6,663,075 | B2 * | 12/2003 | Zuller | 248/478 |
| 6,883,244 | B2 * | 4/2005 | Rimback | 33/613 |
| 6,971,184 | B2 * | 12/2005 | Prevost | 33/613 |
| 7,155,840 | B1 * | 1/2007 | Carbonaro | 33/613 |
| 7,967,269 | B2 * | 6/2011 | Liu | 248/287.1 |
| 8,011,635 | B2 * | 9/2011 | Aleo | 248/476 |

* cited by examiner

*Primary Examiner* — Anita M King

(57) ABSTRACT

A system can be used to hang an object, such as a piece of artwork or a photo, on a wall. The system is configured to easily center the object on a wall and to identify a location on the wall where a nail, hook, or other hanging device can be positioned on the wall to properly center the object.

8 Claims, 5 Drawing Sheets

WALL HANGING SYSTEM

REFERENCE TO PRIORITY DOCUMENTS

This application claims priority of U.S. Provisional Patent Application Ser. No. 61/624,544 entitled WALL HANGING SYSTEM, filed on Apr. 16, 2012. The disclosure of the Provisional Patent Application is hereby incorporated by reference in its entirety.

BACKGROUND

Disclosed is a device that is configured to assist a user in hanging objects, such as artworks and pictures, on a wall.

It can be a very difficult task to hang objects on a wall in a centered manner.

In order to properly center the object on a correct position on a wall, the user often has to employ a trial and error process. This involves the user estimating the correct location to place a nail, then hammering the nail onto the wall, then hanging the object. If the object is not properly centered, then the user repeats the process until the object is properly centered.

It goes without saying that this can be a tedious and frustrating task. It not only needlessly consumes time, but it can also cause aesthetic and functional damage to a wall by forming multiple nail holes in the wall. A user will often resort to settling for an improperly centered position on the wall rather than having to go through the time and effort of properly centering the object.

In view of the foregoing, there is a need for systems and methods of quickly and efficiently hanging an object on a wall in a desired position.

SUMMARY

Disclosed herein is a system that can be used to hang an object, such as a piece of artwork or a photo, on a wall. The system is configured to easily center the object on a wall and to identify a location on the wall where a nail, hook, or other hanging device can be positioned on the wall to properly center the object. The system is described herein in the context of being used to hang a framed artwork on the wall although it is not limited to being used with framed artwork Other features and advantages should be apparent from the following description of various embodiments, which illustrate, by way of example, the principles of the invention.

DETAILED DESCRIPTION

Before the present subject matter is further described, it is to be understood that this subject matter described herein is not limited to particular embodiments described, as such may of course vary. It is also to be understood that the terminology used herein is for the purpose of describing particular embodiments only, and is not intended to be limiting. Unless defined otherwise, all technical terms used herein have the same meaning as commonly understood by one skilled in the art to which this subject matter belongs.

As will be apparent to those of skill in the art upon reading this disclosure, each of the individual embodiments described and illustrated herein has discrete components and features which may be readily separated from or combined with the features of any of the other several embodiments without departing from the scope of the subject matter described herein. Any recited method can be carried out in the order of events recited or in any other order which is logically possible.

Disclosed herein is a system that can be used to hang an object, such as a piece of artwork or a photo, on a wall. The system is configured to easily center the object on a wall and to identify a location on the wall where a nail, hook, or other hanging device can be positioned on the wall to properly center the object. The system is described herein in the context of being used to hang a framed artwork on the wall although it is not limited to being used with framed artwork.

Figure 1:
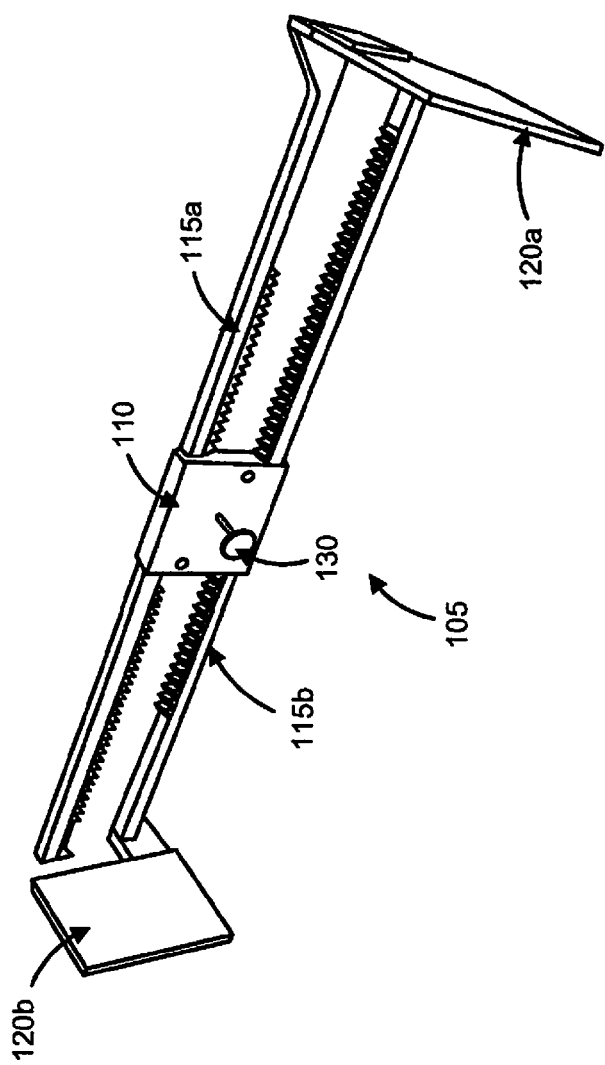
FIG. 1 is a front, perspective view of a wall hanging system.
Figure 2:
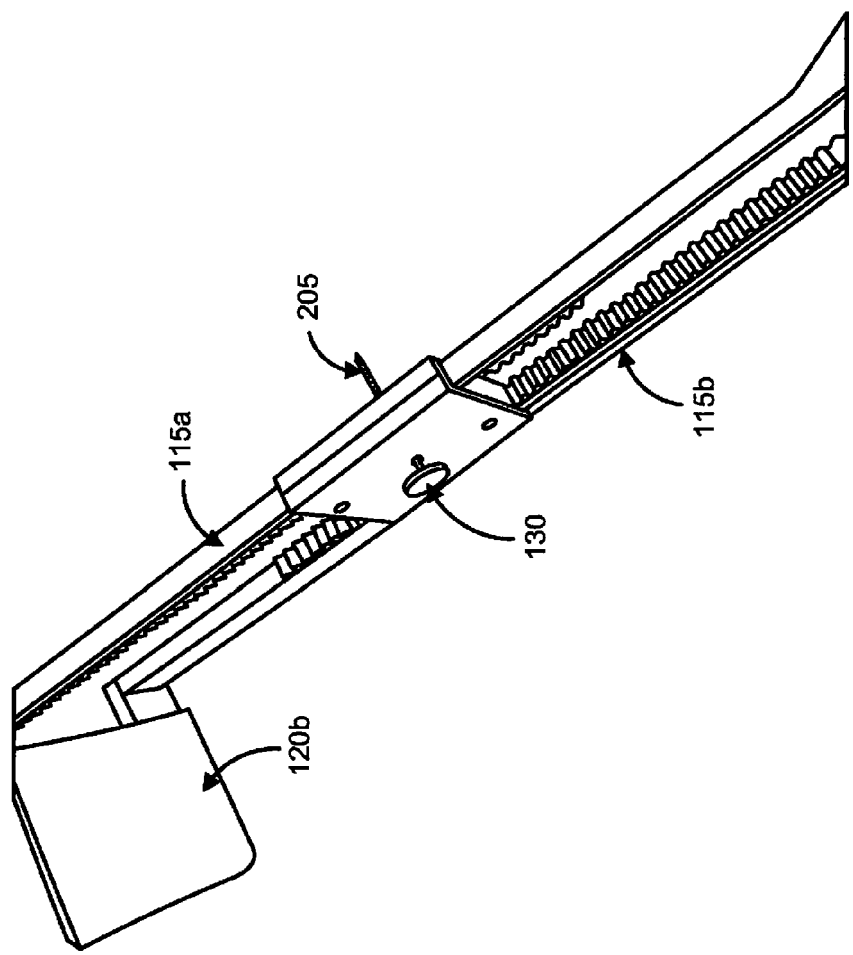
FIG. 2 is a rear, perspective view of the wall hanging system.

FIGS. 1 and 2 show front and rear views of a device 105 that can be used to hang an object on a wall. The device 105 includes a central housing 110 defining an internal cavity that contains a gear or pinion. The pinion is movably coupled to a pair of elongated racks 115 including an upper rack 115a and a lower rack 115b that both extend transversely outward from both sides of the housing 110. The racks 115 have teeth that are configured to engage the internal pinion and that permit the racks 115 to slide outwardly or inwardly relative to the housing 110 along an axis generally parallel to the racks 115.

Each of the racks 115 is attached at a lateral end to a panel 120 including a right panel 120a and a left panel 120b. That is, the right panel 120a is attached to a right end of the upper rack 115a and the left panel 120b is attached to the left end of the lower rack 115b. Each panel 120 is oriented along a plane that is generally normal or substantially normal to axes defined by the racks 115. The panels 120 define a space therebetween that is sized to receive the object to be hung on a wall, such as a framed object.

The racks 115 and attached panels 120 are configured to slidably move outward and inward relative to the housing 110 via the internal pinion in the housing, as described in more detail below. As the panels 120 slide away (or toward) from the housing 110, they slide in such a manner that the housing and a marking element 205 (FIG. 2) remain centered between the two panels 120. That is, the marking element 205 always remains an equal distance from the panel 120a and the panel 120b during movement of the racks 115.

With reference still to FIG. 1, an wall hanging element, such as a pin or hook 130, is positioned on the housing 110 such that the hook 130 extends outwardly from the housing 110, such as a ninety-degree angle from the housing. The hook 130 can be used to attach to a wire or other hanging component of the object that is to be hung, as described in detail below. The hook 130 can be any type of element from which something can be hung and need not be hook-shaped.

With reference to the rear view of FIG. 2, a marking element 205, such as a spike, is positioned on the rear side of the housing 110 opposite the location where the hook 130 is positioned on the front side of the housing 110. The marking element 205 and the hook 130 may be co-axially aligned along a portion of the elements that extend outward from the housing 110. As mentioned, the marking element 205 and the hook 130 are positioned at a center location between the two panels 120. Thus, the distance between the two panels is equal to half the distance between the marking element 205 and each of the panels. The marking element can be any element that is configured to form a mark when pressed against a wall. In the illustrated embodiment, the marking element is a sharp-tipped spike that can be pressed against a wall to form a small hole, although it can be any other device that forms a mark on a wall. The marking element may be made of a material that is sufficiently rigid to form a mark on the wall when pressed against the wall.

As mentioned, the racks 115 are configured to move relative to the center housing 110. The racks 115 are movably attached to an inner pinion in the housing 110 such that the racks 115 can slide outward (away from) or inward (toward) relative to the housing 110 along a direction parallel to the longitudinal axes of the racks 115. The upper rack 115a can slide in unison such that the right panel 120a moves toward or away from the right side of the housing while the lower rack 115b slides so that the left panel 120b moves toward or away from the left side of the housing 110. While the racks 115 slide, the housing 110 always remains centered between the two panels 120. Thus, the hook 130 and the marking element 205 also remain centered between the two panels 120 regardless of how far out the racks have slid.

Figure 3:
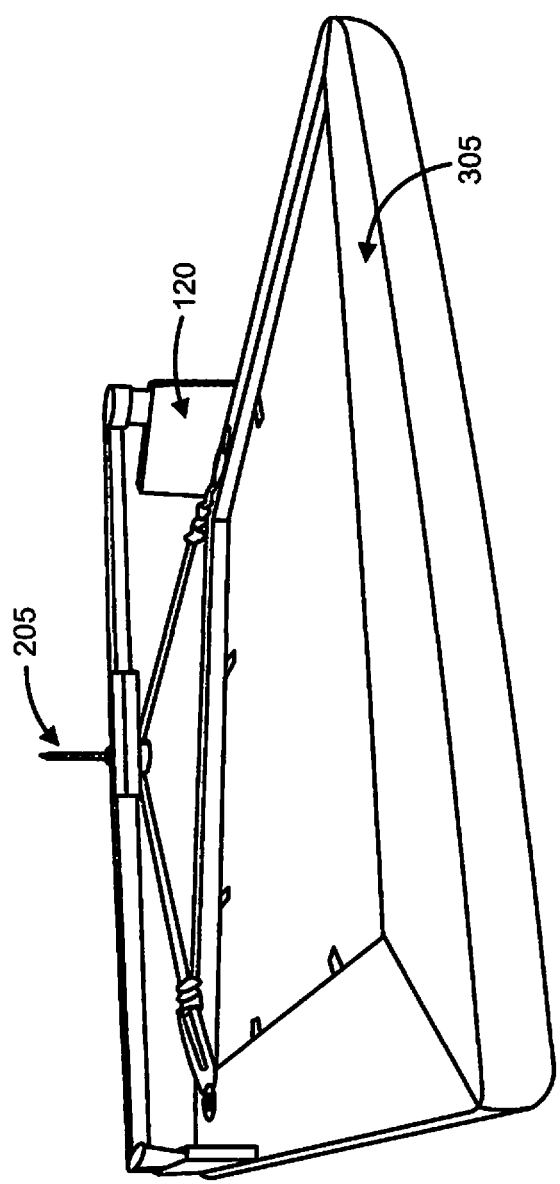
FIG. 3 shows the wall hanging system coupled to an object that is to be hung on a wall.

With reference now to FIG. 3, a framed artwork 305 can be positioned within the device (i.e., within the space between the panels 120) such that panels 120 hung or otherwise abut the lateral edges of the frame. In this manner, the panels 120 are separated by a distance equal to the width of the framed artwork 305. If the artwork 305 has a hook or hanging wire, the hook or hanging wire can be attached to the hook 130 of the device 110 in the same manner that the artwork 305 would be hung on a wall. With the artwork 305 attached to the device 110 as such, the device 110 can be positioned on a wall and pressed against the wall at the desired location where it is to be hung. Or the device 110 can be placed against the wall without the artwork attached as long as the space between the panels 120 is equal to the width of the artwork.

When the device 110 is pressed against the wall, the marking element 205 will also be pressed against the wall so as to form a mark on the wall at the location where a nail or hook should be positioned on the wall for hanging the artwork at the desired location. If the marking element 205 is a spike, then the spike will form a hole or indentation on the wall. The user can then simply remove the device 110 from the wall and hammer a nail or hook into the identified location on the wall. In this manner, the device can be used to quickly and easily identify a location for where the artwork can be hung. The device 110 can include leveling devices and extensions to allow multiple holes to be marked in the wall.

Figure 4:
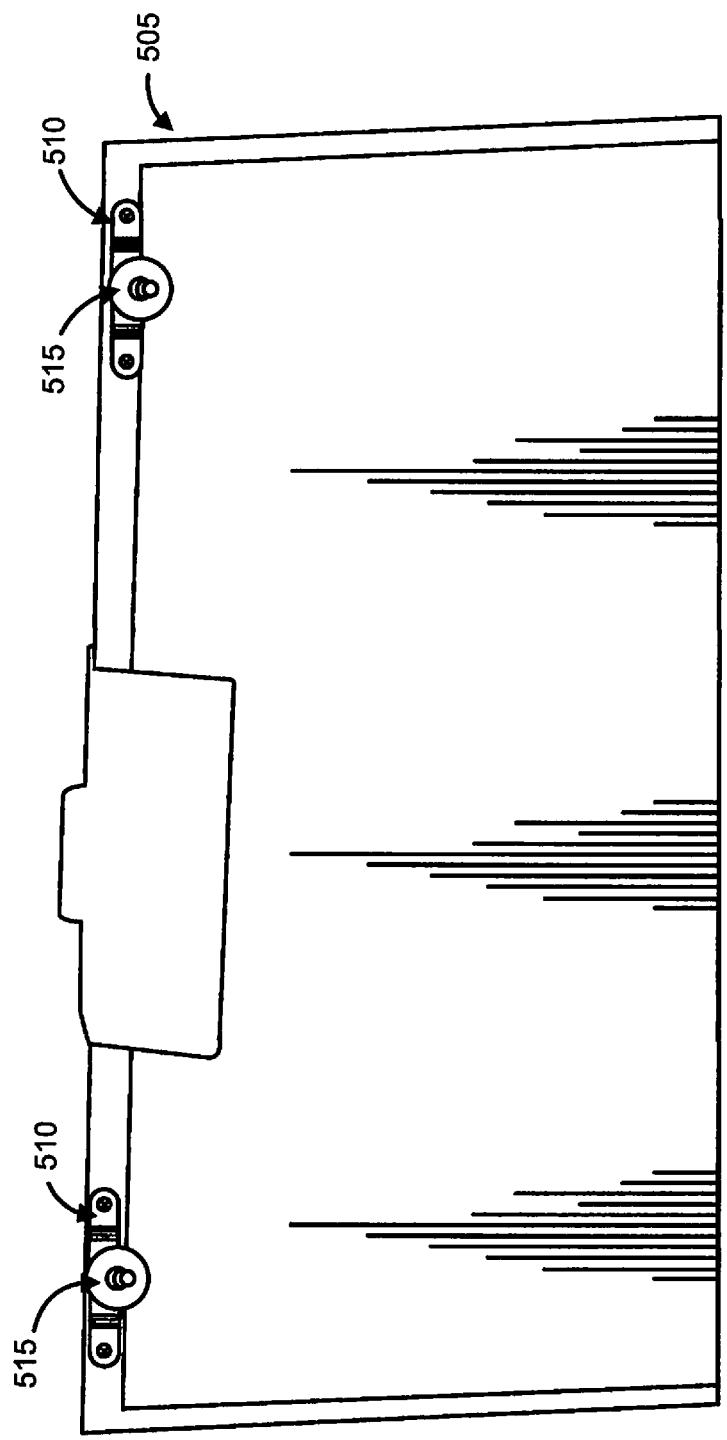
FIG. 4 shows a rear view of another framed artwork with a pair of wall alignment elements.

FIG. 4 shows a rear view of another framed artwork 505. This artwork 505 has a pair of wall mounting elements 510 that are fixedly positioned on the rear of the artwork for hanging the artwork on a wall. The mounting elements 510 can be hooks, nails, ridged racks, or any element mounted on an object for hanging that object on a wall. It can be difficult for a user to properly align a pair of nails on a wall to the locations of the mounting elements 510. It is often a matter of trial and error to properly position such nails on a wall.

Figure 5:
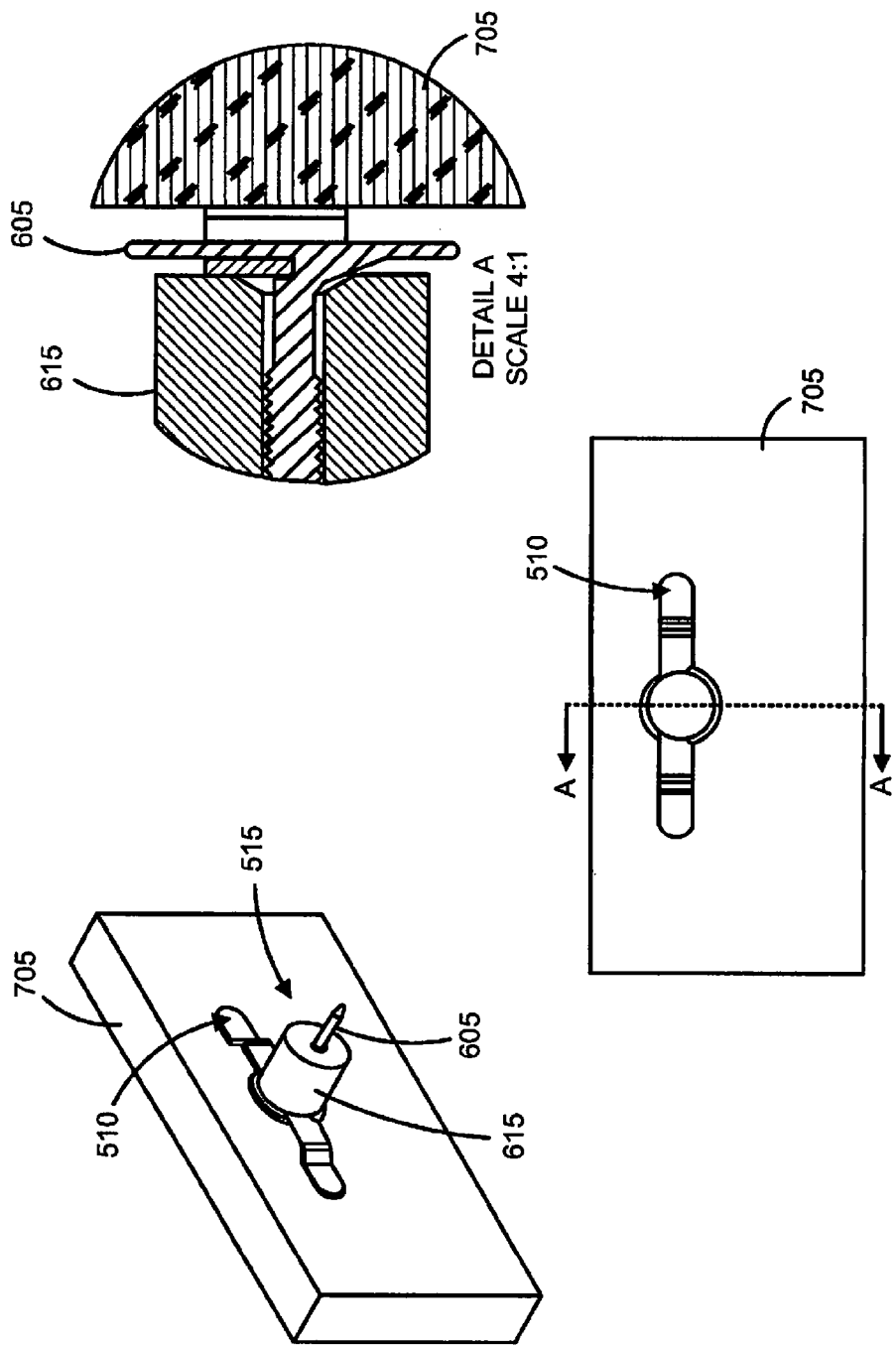
FIG. 5 shows various views of the wall alignment element.

Disclosed is a wall alignment element 515 that can be coupled to the mounting element 505 on an artwork (or other object) for properly identifying and locating a position on a wall where a nail should be inserted for hanging the artwork 505 on the wall. An alignment element 515 can be coupled to each of (one or more) the mounting elements 510 on the artwork 505. With the alignment element(s) 515 coupled to the mounting elements 510 as shown, the artwork can then be positioned against the wall at the desired position to be hung. The alignment elements 515 are facing the wall, in particular a marking element 605 (FIG. 5) is facing the wall when the artwork is faced against the wall. The user then presses the artwork against the wall such that the marking elements 605 form a mark in the wall. Such mark conveniently identifies a location where nails can be positioned for hanging the artwork FIG. 5 shows various views of the wall alignment element 515 mounted on an object 705 that is to be hung on wall. The alignment element 515 is formed of an inner member 605 that has a head and a shank with a pointed end that can be pressed against a wall to form a mark. The shank portion of the inner member is surrounded by a pad 615 that can be made of a resilient material. The inner member and pad collectively are configured to be attached to the mounting element 510 such that they can be secured to the mounting element. In the illustrated embodiment, the pad and the head of the inner member form a space in which the mounting element 510 can be removably positioned for coupling the alignment element 515 to the mounting element 510.

As will be apparent to those of skill in the art upon reading this disclosure, each of the individual embodiments described and illustrated herein has discrete components and features which may be readily separated from or combined with the features of any of the other several embodiments without departing from the scope of the subject matter described herein. Any recited method can be carried out in the order of events recited or in any other order that is logically possible.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

What is claimed is:

1. A system for hanging an object on a wall, comprising:
a housing;
a wall marker extending outward from a first side of the housing such that the wall marker makes a mark on a wall when the first side of the housing is pressed against the wall;
a pair of panels attached to the housing and movable along an axis relative to the housing, the panels defining a space therebetween sized to receive an object to be hung on a wall such that the distance between the panels can be made equal to a size of the object to be hung on the wall, and wherein the wall marker remains centered between the panels regardless of the position of the panels relative to the housing; and
at least one rack that movably attaches the pair of panels to the housing.

2. A system as in claim 1, wherein the rack is mechanically coupled to a pinion inside the housing.

3. A system as in claim 1, wherein the wall marker is a spike.

4. A system as in claim 1, further comprising a hanging element on a second side of the housing opposite the first side, the hanging element configured to support the object to be hung.

5. A system as in claim 4, wherein the hanging element is centered between the pair of panels.

6. A system as in claim 4, wherein the hanging element is a hook.

7. A system as in claim 1, wherein the at least one rack comprises a first rack and a second rack.

8. A system as in claim 7, wherein the first rack is attached to a first panel and the second rack is attached to a second panel.

* * * * *